(12) United States Patent
Meier et al.

(10) Patent No.: US 11,092,690 B1
(45) Date of Patent: Aug. 17, 2021

(54) PREDICTING LIDAR DATA USING MACHINE LEARNING

(71) Applicant: Apple Inc., Cupertino, CA (US)

(72) Inventors: Peter Meier, Los Gatos, CA (US); Abhishek Sharma, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 489 days.

(21) Appl. No.: 15/711,982

(22) Filed: Sep. 21, 2017

Related U.S. Application Data

(60) Provisional application No. 62/398,420, filed on Sep. 22, 2016.

(51) Int. Cl.
*G01S 17/931* (2020.01)
*G06N 20/00* (2019.01)

(52) U.S. Cl.
CPC .......... *G01S 17/931* (2020.01); *G06N 20/00* (2019.01)

(58) Field of Classification Search
None
See application file for complete search history.

(56) References Cited

U.S. PATENT DOCUMENTS

| | | | | |
|---|---|---|---|---|
| 6,563,452 B1 * | 5/2003 | Zheng | ...................... | G01S 7/003 342/26 R |
| 7,196,305 B2 * | 3/2007 | Shaffer | ...................... | B60S 1/08 250/208.1 |
| 8,098,171 B1 * | 1/2012 | Szczerba | ................ | G08G 1/166 340/905 |
| 8,401,242 B2 * | 3/2013 | Newcombe | ............. | A63F 13/42 382/107 |
| 8,849,494 B1 * | 9/2014 | Herbach | ............... | B60W 30/00 701/24 |
| 8,855,848 B2 * | 10/2014 | Zeng | ..................... | G01S 13/867 701/28 |
| 9,128,185 B2 | 9/2015 | Zeng | | |
| 9,129,211 B2 | 9/2015 | Zeng | | |
| 9,648,313 B1 * | 5/2017 | Henry | ................ | G02B 27/0101 |
| 9,754,192 B2 | 9/2017 | Yoon et al. | | |
| 9,840,256 B1 * | 12/2017 | Valois | ..................... | G01S 17/86 |
| 10,000,000 B2 * | 6/2018 | Marron | ................ | G01S 7/4863 |
| 10,353,053 B2 | 7/2019 | Rohani et al. | | |
| 10,429,839 B2 * | 10/2019 | Liu | ........................ | B64C 39/024 |

(Continued)

OTHER PUBLICATIONS

Learning 3-D Scene Structure from a Single Still Image, Ashutosh Saxena (Year: 2007).*

(Continued)

*Primary Examiner* — Yuqing Xiao
*Assistant Examiner* — Amir J Askarian
(74) *Attorney, Agent, or Firm* — Robert C. Kowert; Kowert, Hood, Munyon, Rankin & Goetzel, P.C.

(57) ABSTRACT

A vehicle including one or more sensors, a light detection and ranging (lidar) sensor and a lidar prediction system. The one or more sensors include an optical sensor, a radar sensor, or both, configured to capture sensor data of a particular view. The lidar sensor is configured to capture lidar data of the particular view. The lidar prediction system includes a predictive model. The lidar prediction system is configured to generate a predicted lidar frame comprising applying the predictive model to the sensor data and send the predicted lidar frame to an external system.

20 Claims, 9 Drawing Sheets

(56) References Cited

U.S. PATENT DOCUMENTS

| | | | | |
|---|---|---|---|---|
| 10,495,757 | B2* | 12/2019 | Dussan | G01S 7/4817 |
| 2010/0053330 | A1* | 3/2010 | Hellickson | G01S 19/13 |
| | | | | 348/153 |
| 2010/0204964 | A1* | 8/2010 | Pack | G06T 7/521 |
| | | | | 703/1 |
| 2015/0310281 | A1* | 10/2015 | Zhu | G06K 9/00805 |
| | | | | 382/104 |
| 2015/0317781 | A1* | 11/2015 | Napier | G01S 17/86 |
| | | | | 348/46 |
| 2016/0035081 | A1* | 2/2016 | Stout | G01S 17/89 |
| | | | | 382/103 |
| 2016/0070265 | A1* | 3/2016 | Liu | G01C 21/00 |
| | | | | 701/3 |
| 2017/0345321 | A1* | 11/2017 | Cross | B64D 45/08 |
| 2017/0356993 | A1* | 12/2017 | Lee | G01S 13/865 |
| 2019/0113603 | A1* | 4/2019 | Wuthishuwong | G01C 21/34 |

OTHER PUBLICATIONS

Depth Map Prediction from a Single Image using a Multi-Scale Deep Network, David Eigen (Year: 2014).*
Automatic Camera and Range Sensor Calibration using a single Shot, Andreas Geiger (Year: 2012).*
Vision-Based Obstacle Detection and Avoidance for the CWRU Cutter Auton omous Lawnmower, Alexander Schepelmann (Year: 2009).*
Depth Extraction from Video Using Non-parametric Sampling, Kevin Karsch (Year: 2012).*

* cited by examiner

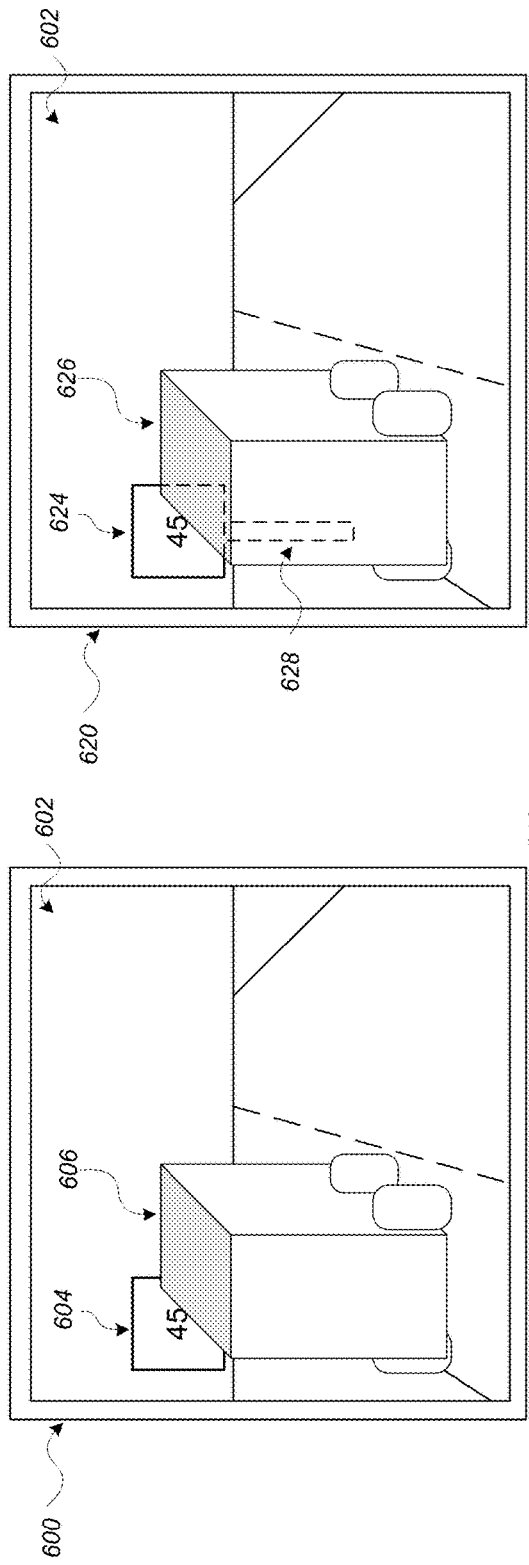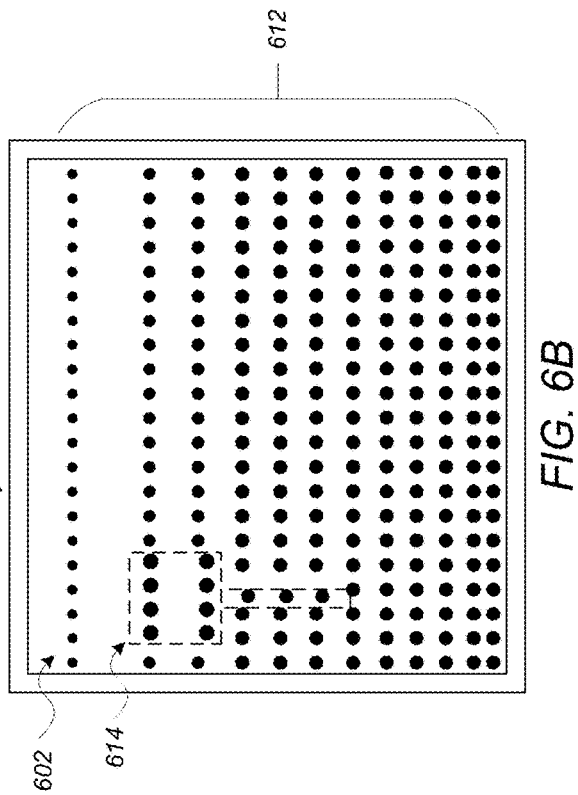
FIG. 6A
FIG. 6B
FIG. 6C

PREDICTING LIDAR DATA USING MACHINE LEARNING

This application claims benefit of priority to U.S. Provisional Application No. 62/398,420, filed Sep. 22, 2016, titled "Predicting Lidar Data using Machine Learning," which is hereby incorporated by reference in its entirety.

BACKGROUND

Vehicles use light detection and ranging (lidar) sensors to detect the nearby environment. An autonomous vehicle may use lidar sensors to determine objects or other vehicles on the road to determine appropriate driving actions to perform. The autonomous vehicle may also include additional sensors, such as an optical sensor (e.g., a camera) or a radar sensor, to determine additional information of the nearby environment. Although lidar sensors are capable of sensing environmental information in a form that is interpretable by machine learning algorithms or decision-making systems, lidar sensors are currently slower than existing cameras or radar sensors.

Cameras or radar sensors may be able to capture image frames or radar data frames, respectively, at a rate that is faster than a capture rate of lidar sensors. Thus, the autonomous vehicle may utilize image data or radar data from the cameras or radar sensors to supplement lidar data from the lidar sensors. The autonomous vehicle may read the image data or radar data to determine objects in the nearby environment. A combination of image data, radar data and lidar data allow for the autonomous vehicle to have a more complete understanding of its surroundings. Lidar data is more robust than image data or radar data for machine learning and interpretation such that additional lidar data must be accessible at a rate faster than the capture rate of the lidar sensor.

SUMMARY

Systems and methods for predicting lidar data at a vehicle using machine learning are described herein. In some embodiments, a vehicle may include one or more sensors, a light detection and ranging (lidar) sensor and a lidar prediction system. The one or more sensors includes an optical sensor, a radar sensor, or both, configured to capture sensor data of a particular view. The lidar sensor is configured to capture lidar data of the particular view. The lidar prediction system includes a predictive model. The lidar prediction system is configured to generate a predicted lidar frame by applying the predictive model to the sensor data captured by the one or more sensors and send the predicted lidar frame to an external system.

In other embodiments, a method for generating a predictive model for predicting lidar frames is described herein. The method includes receiving, from one or more training vehicles, a plurality of lidar frames for a plurality of locations, wherein the plurality of lidar frames indicates a plurality of objects at the plurality of locations. The method also includes receiving, from the one or more training vehicles, a plurality of sensor frames from one or more sensors of the one or more training vehicles for the plurality of locations. The method further includes determining a mapping between lidar data points of the plurality of lidar frames and the plurality of sensor frames from the one or more sensors based on the plurality of lidar frames with the plurality of sensor frames from one or more sensors. The method also includes generating a predictive model configured to convert sensor frames from one or more sensors to a lidar frame based on the mapping between the lidar data points and the plurality of sensor frames from the one or more sensors.

In yet other embodiments, a non-transitory computer-readable storage medium storing instructions that, when executed by one or more processors, cause the one or more processors to perform operations is disclosed herein. The operations include receiving, from one or more sensors, sensor data for a particular view. The operations also include receiving, from a light detection and ranging (lidar) sensor, lidar data for the particular view. The operations further include mapping the lidar data to the sensor data and identifying a portion of the sensor data that is lacking corresponding mapped lidar data. The operations also include generating additional lidar data for the portion based on the sensor data.

BRIEF DESCRIPTION OF THE DRAWINGS

FIG. 6A illustrates an image frame depicting a vehicle obstructing view of a road sign.

FIG. 6B illustrates a predicted lidar frame generated by a detection system depicting an environment.

FIG. 6C illustrates a heads-up display generated based on predicted lidar frames indicating obstructed portions of the road sign.

DETAILED DESCRIPTION

Figure 1:
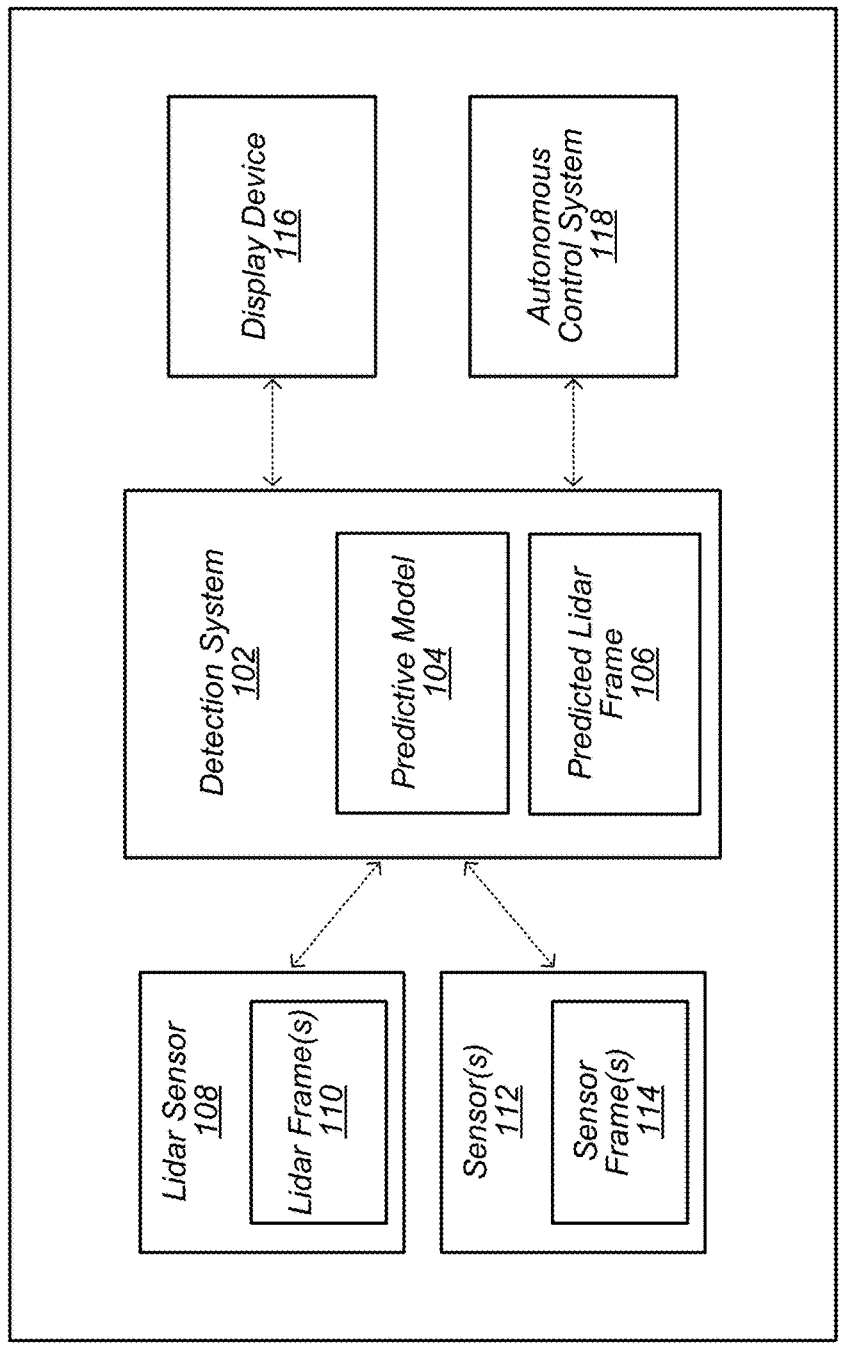
FIG. 1 illustrates a block diagram of a vehicle having one or more sensors configured to detect another vehicle, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . " Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

FIG. 1 illustrates a vehicle 100 according to some embodiments. The vehicle 100 may include a detection system 102, a light detection and ranging (lidar) sensor 108, one or more other sensors 112 and a display device 116.

The lidar sensor 108 may be configured to capture one or more lidar frames 110. The lidar sensor 108 may be configured to project a light signal. The light signal may include a near-infrared light signal that is substantially invisible to human vision while being detectable by optical sensors. The lidar signal may have a wavelength of approximately 780-1000 nm. The light signal may be reflected by one or more retroreflectors embedded in an object. The object may include a road sign, a building, another vehicle, a lane marker or any other structure that needs to be visible by the vehicle 100. The one or more retroreflectors may reflect the light signal as a reflected light signal. The lidar sensor 108 may be configured to receive the reflected light signal. The lidar sensor 108 may generate the one or more lidar frames 110 based on the reflected light signal.

The lidar frame 110 may indicate one or more points in real space of a scene which reflected the light signal. For example, the one or more lidar frames 110 may include a point cloud representation of the one or more points in real space. In other embodiments, the one or more lidar frames 110 may include a point-based representation of the scene that may be integrated with one or more sensor frames of the scene (e.g., one or more sensor frames 114 from the one or more sensors 112). For example, the one or more lidar frames 110 may be overlaid on the one or more sensor frames 114 to provide or generate additional information, such as depth or texture, that is not contained in the one or more sensor frames 114.

The one or more other sensors 112 may also be referred to as the one or more sensors 112 or the other sensors 112 herein. The one or more sensors 112 may be configured to capture one or more sensor frames 114. In some embodiments, the one or more sensors 112 may include an optical sensor, such as a camera, configured to capture one or more image frames. For example, the camera may be configured to capture red-green-blue (RGB) image data. In other embodiments, the camera may be configured to capture red-green-blue-depth (RGB-D) image data. In yet other embodiments, the camera may be configured to capture cyan-magenta-yellow-black (CMYK) image data or any other image data type with a wide color gamut (e.g., to capture more visible light). In other embodiments, the imaging sensor may include a radar sensor frames. The radar sensor may be configured to capture radar data frames. The lidar sensor 108 may have a capture rate or frame rate that is slower than a capture rate or frame rate of the one or more sensors 112. For example, the lidar sensor 108 may capture a lidar frame in a time period in which the one or more sensors 112 captures more than one sensor frame. In some embodiments, the one or more sensors 112 may capture one or more sensor frames with a fast (e.g., 5 ms) response time or latency, whereas the lidar sensor 108 may capture one or more lidar frames with a slower (e.g., 25 ms) response time. Accordingly, the detection system 102 may be configured to predict a lidar frame 106 based on one or more sensor frames 114 captured by the one or more sensors 112.

The detection system 102 may be configured to generate a predicted lidar frame 106 to accommodate for the slower response time of the lidar sensor 108 relative to the imaging sensor 112. For example, the predicted lidar frame 106 may be used when the one or more lidar sensors 108 are unable to generate a lidar frame 110 within a particular time threshold. In other embodiments, the one or more sensors 112 may have a latency that is similar to a latency of the one or more lidar sensors 108. In these embodiments, the predicted lidar frame 106 may be used as part of a redundancy check to verify that detected objects are in fact present and in view of the one or more lidar sensors 108. In some embodiments, the detection system 102 may utilize a predictive model 104 to generate the predicted lidar frame 106. The predictive model 104 may include one or more transformation functions that may be applied to sensor data, such as one or more sensor frames 114. For example, the one or more transformation functions may be configured to determine a change in depth of objects in the one or more sensor frames 114 to determine a possible lidar data point to include in the predicted lidar frame 106. In some embodiments, the predictive model 104 may be generated by a model generation system that is separate from the vehicle 100, as described herein. For example, the model generation system may be configured to generate the predictive model 104 and then send the predictive model 104 to the vehicle 100. The model generation system may generate the predictive model 104 prior to production and manufacturing of the vehicle 100. The model generation system may update or refine the predictive model 104 over time after the vehicle 100 has the predictive model 104 stored to the detection system 102. The vehicle 100 may receive an updated version of the predictive model 104 via a network. The network may, in various embodiments, include one or more networks including but not limited to Local Area Networks (LANs) (e.g., an Ethernet or corporate network), Wide Area Networks (WANs) (e.g., the Internet), wireless data networks, some other electronic data network, or some combination thereof.

The detection system 102 may be configured to determine an offset for the predicted lidar frame 106 based on between a relative position of the lidar sensor 108 and the other sensors 112. In some embodiments, the lidar sensor 108 and the other sensors 112 are physically positioned in different locations on the vehicle 100. For example, the lidar sensor 108 may be positioned at a front grill or a front bumper of the vehicle 100. The other sensors 112 may be positioned at an elevated position, such as at a rear-view mirror of the vehicle 100. In some embodiments, the detection system 102 may include offset information that indicates installation locations of the lidar sensor 108 and the other sensors 112. An elevated position of the other sensors 112 may allow the one or more sensor frames 114 to capture information about the environment when the lidar sensor 108 may be momentarily obstructed, such as by small animals or shadows. In some embodiments, the detection system 102 may skew or morph the one or more sensor frames 114 prior to generating the predicted lidar frame 106. In other embodiments, the detection system 102 may skew the predicted lidar frame 106 during generation thereof.

The detection system 102 may generate the predicted lidar frame 106 based on applying the predictive model 104 to a plurality of lidar frames 110 with a plurality of sensor frames 114, a most recent sensor frame 114, or both. For example, three recently captured lidar frames 110 and the most recent sensor frame 114 or the plurality of sensor frames 114 from the other sensors 112 may be used as input values for the predictive model 104 to generate the predicted lidar frame 106. The predictive model 104 may be configured to process the most recent sensor frame 114 or the plurality of sensor frames 114 to generate the predicted lidar frame 106 at a speed faster than the lidar sensor 108 can capture a new lidar frame. The predictive model 104 may utilize machine learning algorithms to apply the recently captured lidar frames 110 to determine lidar data points based on the most recent sensor frame 114 or the plurality of sensor frames 114.

The detection system 102 may generate the predicted lidar frame 106 further based on vehicle motion data and map data in addition to the plurality of lidar frames 110 and the plurality of sensor frames 114. In some embodiments, the vehicle motion data may indicate a current state of motion of the vehicle 100. For example, the one or more sensors 112 may include motion sensors, such as accelerometers or gyroscopes, configured to. The vehicle motion data may also include past vehicle motion data of the vehicle 100. The past vehicle motion data may indicate a previous speed, acceleration, trajectory, or any combination thereof. In other embodiments, the vehicle motion data may be captured from other analog gauges or meters of the vehicle 100, such as a speedometer. In some embodiments, the one or more sensors 112 may include a location sensor, such as a global positioning satellite (GPS) system. The map data may include two-dimensional (2D) map data configured to identify locations and roads in a 2D plane. Additionally, the map data may include three-dimensional (3D) map data that includes 3D representations of various landmarks, such as buildings, trees, sign posts, terrain, etc. Thus, the detection system 102 may modify generation of the predicted lidar frame 106 based on the vehicle motion data indicating a particular path of motion around particular landmarks identified in the map data.

In some embodiments, the detection system 102 may capture a particular lidar frame 110 and a particular sensor frame 114 having similar capture times or timestamps. The detection system 102 may calculate or determine a latency difference between the particular lidar frame 110 and the particular sensor frame 114. The detection system 102 may generate a latency compensation model based on the determined latency difference. In some embodiments, the latency compensation model may be included or added to the predictive model 104. The detection may modify the particular lidar frame 110 based on the latency compensation model.

The detection system 102 may also be configured to refine the predictive model 104 based on a comparison between the predicted lidar frame 106 with the one or more lidar frames 110 captured by the lidar sensor 108. In some embodiments, the detection system 102 may include a machine learning module configured to analyze the predicted lidar frame 106 for accuracy against the one or more lidar frames 110. For example, the machine learning module may determine that the predicted lidar frame 106 and the one or more lidar frames 110 have substantially concurrent timestamps and thus represent the same point in time. The machine learning module may compare lidar data points in the predicted lidar frame 106 and the one or more lidar frames 110 to determine if the predicted lidar frame 106 is accurate. Based on a determination of accuracy, the machine learning module may modify the predictive model 104 to improve the one or more transformative functions of the predictive model 104 thus improving the accuracy of future predicted lidar frames 106.

The detection system 102 may be configured to send the predicted lidar frame 106 to a display device 116. The display device 116 may be configured to display information about a surrounding environment in which the vehicle 100 is present. The information about the surrounding environment may be based on the vehicle motion data and the map data, as described herein. In some embodiments, the display device 116 may include a screen that includes one or more visual display elements (e.g., light emitting diodes, a liquid crystal display, a plasma screen, a cathode ray tube display, etc.). In other embodiments, the display device 116 may include a projector configured to display a heads-up display at one or more inner surfaces of the vehicle (e.g., a windshield or a console panel). In some embodiments, the predicted lidar frame 106 is used by non-critical features (e.g., functions not related to autonomous driving function). Examples of non-critical features may include augmented reality or a heads-up display via the display device 116.

The display device 116 may also be configured to display information about another vehicle detected in the surrounding environment. In some embodiments, the display device 116 may display information corresponding to the other vehicle, such as a make, model, specification, etc. for the other vehicle. For example, the display device 116 may display a make and model of the other vehicle on the display to inform a passenger of the vehicle 100. In another example, the display device 116 may indicate whether the other vehicle is an autonomous vehicle.

The vehicle 100 may also include an autonomous control system 118. The autonomous control system 118 may be configured to process or utilize the one or more lidar frames 110, the sensor frames 114, the predicted lidar frame 106, or any combination thereof, to perform autonomous control of the vehicle 100. The autonomous control system 118 may be implemented in a vehicle 100 which can be "unmanned" or accommodate one or more occupants, including one or more of a land vehicle (e.g., an automobile, truck, or van) aircraft, or watercraft. The autonomous control system 118 may enable autonomous navigation of the vehicle 100 along one or more various routes through one or more various environments, where the autonomous control system 118 determines and selects the routes along which the autonomous control system navigates vehicle 100. The autonomous control system 118 controls various control elements of the vehicle 100 to autonomously direct (e.g., drive) the vehicle 100 (herein referred to as "autonomously navigate", "autonomous navigation", etc.) along one or more portions of a route.

The autonomous control system 118 may receive sensor data, including the one or more lidar frames 110, the sensor frames 114, the predicted lidar frame 106, or any combination thereof, from the detection system 102. In some embodiments, the autonomous control system 118 may receive the predicted lidar frame 106 from the detection system 102 to determine to perform one or more autonomous control functions. For example, the autonomous control system 118 may determine that a particular object is indicated in the predicted lidar frame 106. The autonomous control system 118 may develop, select or change driving routes based on an indication of the particular object in the predicted lidar frame 106.

Figure 2:
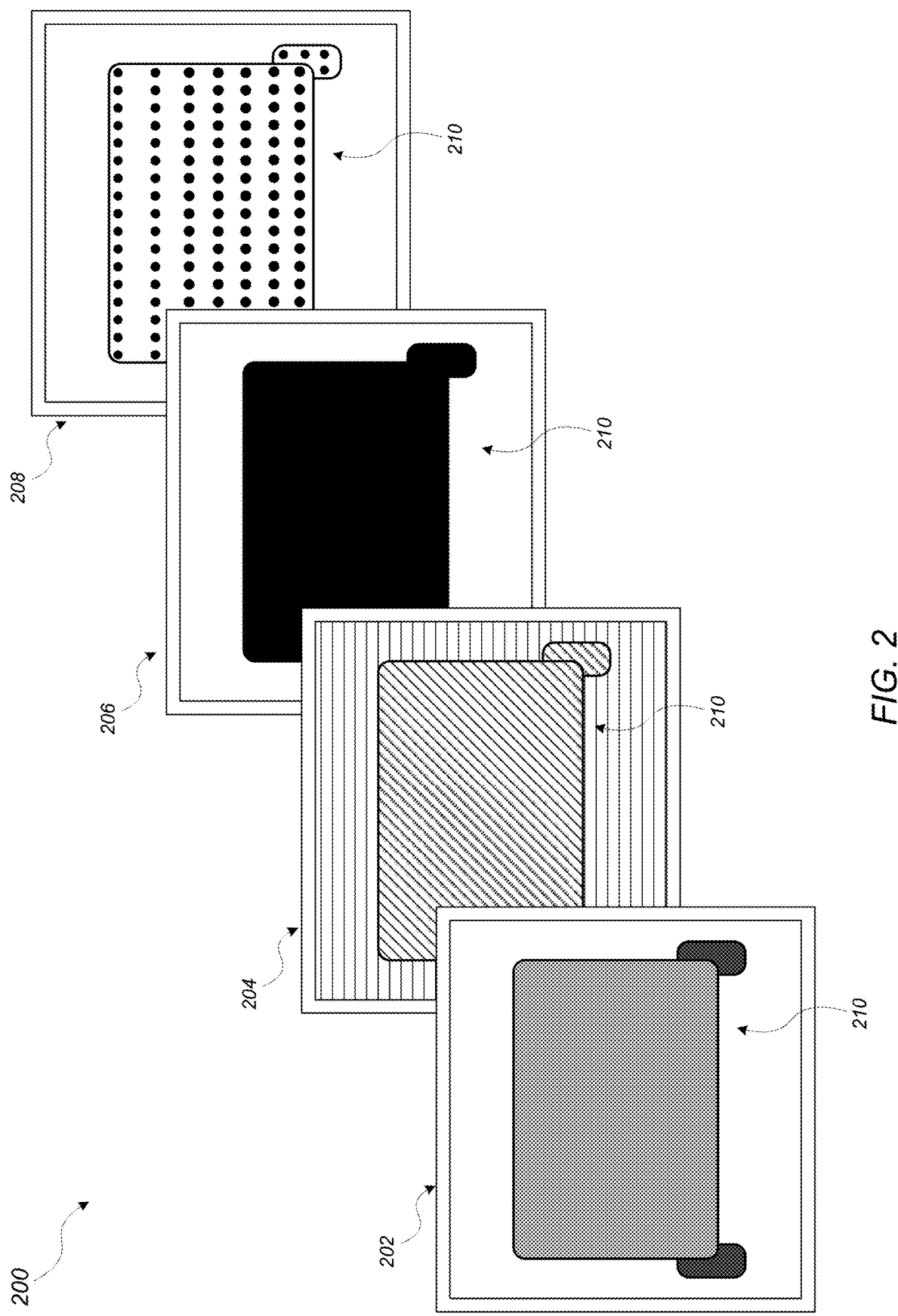
FIG. 2 illustrates multiple data frames used in detecting a vehicle or understanding a nearby environment for enabling autonomous driving, according to some embodiments.

FIG. 2 illustrates a detection system 200 utilizing multiple data frames to detect a vehicle 210 or to understand a nearby environment for enabling autonomous driving, according to some embodiments.

An intensity frame 202 may be captured by an optical sensor, such as a camera. The intensity frame 202 may indicate color information for the vehicle 210. The color information may correspond to the visual appearance of the vehicle 210 in real space.

A depth frame 204 or a disparity frame may be captured by a depth sensor. In other embodiments, the depth frame 204 may be extrapolated based on data captured by a stereoscopic camera, a radar sensor, a lidar sensor or any combination thereof. The depth frame 204 may indicate that the vehicle 210 is closer in proximity than a background.

A radar frame 206 may be captured by a radar sensor. The radar sensor may send a radar signal to determine the presence of the vehicle 210. In some embodiments, the radar sensor may detect the vehicle 210 and indicate a relative distance to the vehicle 210.

A lidar frame 208 may be captured by a lidar sensor. The lidar sensor may be configured to send a light signal including multiple points of light. The light signal may be reflected by one or more retroreflectors embedded in the vehicle 210. The one or more retroreflectors may be configured to reflect the light signal as a reflected light signal. The lidar frame 208 may indicate multiple lidar data points that represent the vehicle 210.

The detection system 200 may aggregate the intensity frame 202, the depth frame 204, the radar frame 206, the lidar frame 208, any multiples thereof or any combination thereof to determine information about the vehicle 210 or the nearby environment. For example, the detection system 200 may determine that the vehicle 210 is moving away or moving closer based on multiple data frames over a period of time. In some embodiments, the detection system 200 may use different data frames as a redundancy check of other data frames. For example, the detection system 200 may use the lidar frame 208 to verify that the vehicle 210 is at a particular distance as indicated in the depth frame 204. In other embodiments, the intensity frame 202 or the radar frame 206 may be used by the detection system 200 to fill in gaps between the lidar data points of the lidar frame 208. Over time, the multiple data frames of different data types may improve a temporal reconstructive signal.

Figure 3:
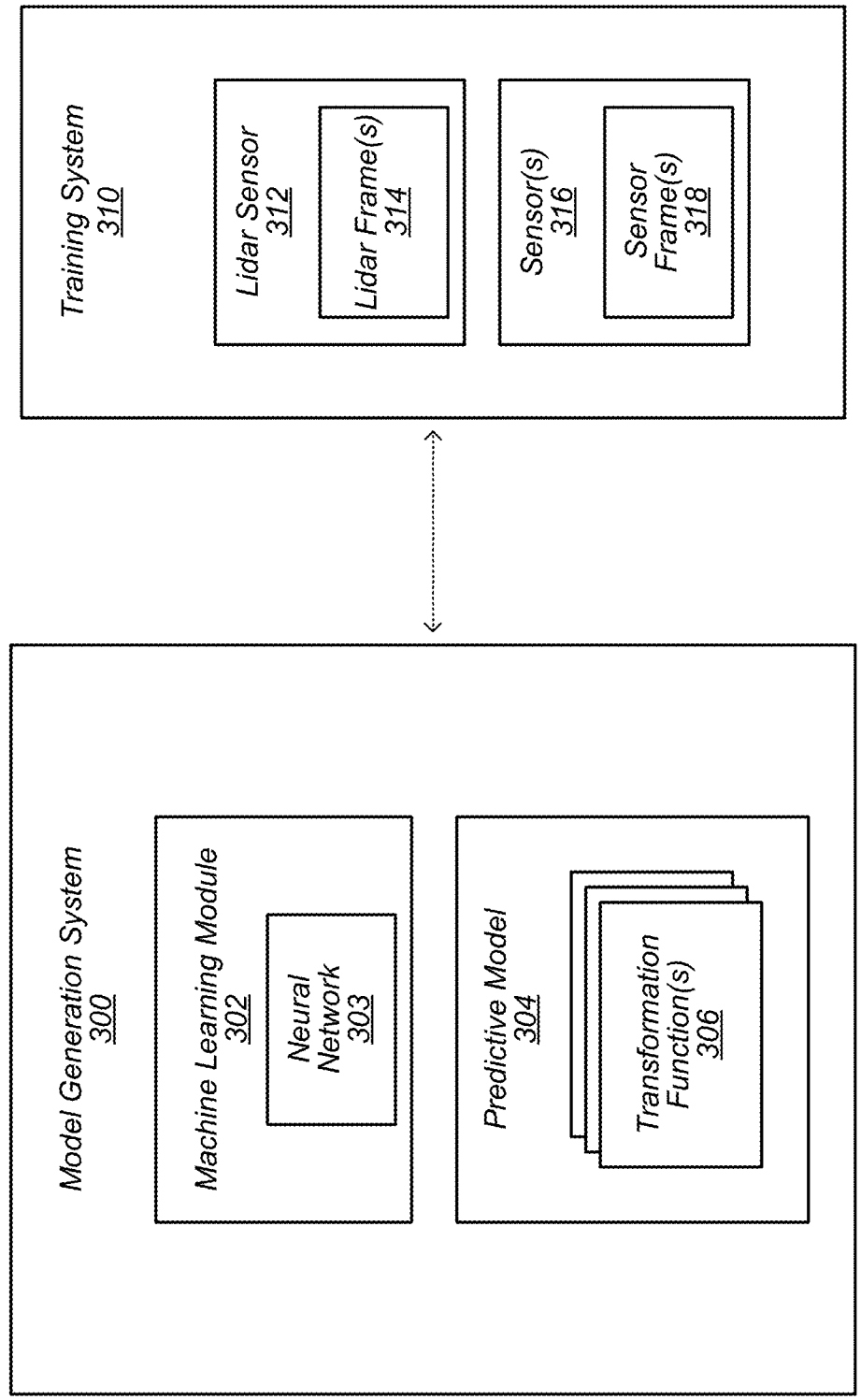
FIG. 3 illustrates a model generation system configured to generate a predictive model to generate a predicted lidar frame from one or more sensor frames from one or more sensors, according to some embodiments.

FIG. 3 illustrates a model generation system 300 configured to generate a predictive model 304 that may generate a predicted lidar frame from one or more sensor frames captured by one or more sensors, such as one or more image frame captured by an optical sensor or one or more radar data frame captured by a radar sensor, according to some embodiments.

The model generation system 300 may be configured to generate the predictive model 304 based on information provided by one or more training systems 310. The training system 310 may include a training vehicle configured with one or more lidar sensors 312 configured to capture one or more lidar frames 314 and one or more other sensors 316 (e.g., an optical sensor and/or a radar sensor) configured to capture one or more sensor frames 318. For example, the training vehicle may drive around multiple locations to capture the one or more lidar frames 314 and the one or more sensor frames 318 over multiple time periods. In some embodiments, the training system 310 may include multiple training vehicles each configured to capture multiple lidar frames 314 and multiple sensor frames 318 over long periods of time at multiple locations. In some embodiments, the training system 310 may include multiple lidar sensors 312 and multiple other sensors 316 in multiple locations of the training system 310. For example, the training system 310 may include more lidar sensors 312 and other sensors 316 that a number of lidar sensors and other sensors found in a production vehicle, such as the vehicle 100 of FIG. 1.

In some embodiments, the lidar sensors 312 may be positioned proximate to the other sensors 316. For example, the lidar sensors 312 may be positioned closer to the other sensors 316 in the training system 310 than in a production vehicle. By positioning the lidar sensors 312 closer to the other sensors 316, the predictive model 304 may be generated based on closer data points. For example, the one or more lidar frames 314 and the one or more sensor frames 318 may be substantially the same view of the environment, whereas the production vehicle may have substantially different viewing angles of the environment between the lidar sensors and the other sensors.

The other sensors 316 may also include one or more motion sensors configured to measure motion data of the training system 310. For example, the motion sensors may include accelerometers or gyroscopes configured to measure a current speed, acceleration or trajectory of the training system 310. The other sensors 316 may further include a location sensor configured to determine a location of the training system 310. The location determined by the location sensor may be correlated or associated with one or more lidar frames 314 and one or more sensor frames 318 captured contemporaneously by the lidar sensors 312 or the other sensors 316.

The training vehicle may provide the lidar frames 314 and the sensor frames 318 to the model generation system 300. The model generation system 300 may correlate the lidar frames 314 to the sensor frames 318 to generate one or more transformation functions 306. For example, the model generation system 300 may analyze the sensor frames 318 to determine that a particular orientation of objects in a scene have a particular orientation of lidar data points. Based on an analysis of the particular orientations, the model generation system 300 may determine a transformation function 306 that generates the particular orientation of lidar data points based on the particular orientation of objects. The transformation function 306 may be based on location, time of day, weather conditions, speed, driving conditions, any other factors or any combination thereof.

The model generation system 300 may include a machine learning module 302 configured to generate the transformation function 306 may be generated based on one or more machine learning algorithms. In some embodiments, the machine learning module 302 may implement a neural network, such as a deep neural network (DNN) 303, to generate the transformation function 306. The DNN 303 may be configured to adapt over multiple lidar frames 314 and multiple sensor frames 318. Thus, the DNN 303 may train itself to improve correlation between the lidar frames 314 and the sensor frames 318 such that the transformation functions 306 are more robust after training. In other embodiments, the machine learning module 302 may implement one or more other types of neural networks, including, but not limited to, a long short-term memory (LSTM), a fully recurrent neural network (RNN), a recursive neural network, a Hopfield network, an echo state network, a bi-directional RNN, a continuous-time RNN, a hierarchical RNN, a recurrent multilayer perceptron, a second order RNN, a multiple timescales RNN, a bidirectional associative memory, a convolutional neural network, a neural history compressor, a deep believe network, a convolutional deep belief network, a large memory storage and retrieval neural network, etc.

The model generation system 300 may provide the predictive model 304 to one or more vehicles. The one or more vehicles may include the vehicle 100 of FIG. 1. In some embodiments, the model generation system 300 may provide the predictive model 304 during production of the one or more vehicles. For example, generation of the predictive model 304 may occur at a time before the one or more vehicles are manufactured and distributed. In other embodiments, the model generation system 300 may provide the predictive model 304 via a network. The network may, in various embodiments, include one or more networks including but not limited to Local Area Networks (LANs) (e.g., an Ethernet or corporate network), Wide Area Networks (WANs) (e.g., the Internet), wireless data networks, some other electronic data network, or some combination thereof. For example, the predictive model 304 may be refined by the model generation system 300 at a subsequent time to when the predictive model 304 was originally provided to the one or more vehicles.

Figure 4B:
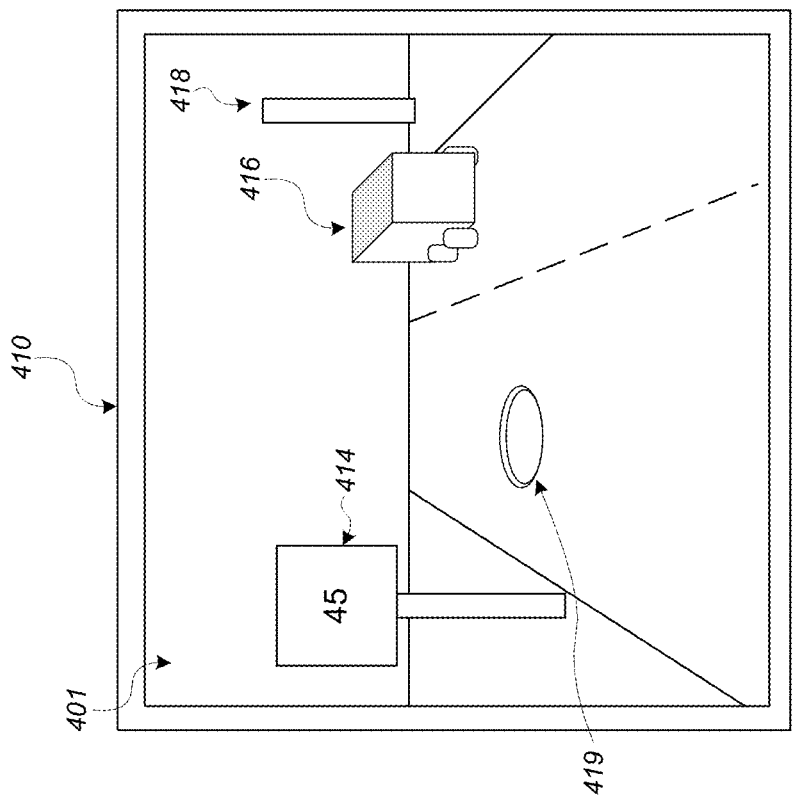
FIGS. 4A-B illustrate sensor data captured by a vehicle, according to some embodiments.
Figure 4A:
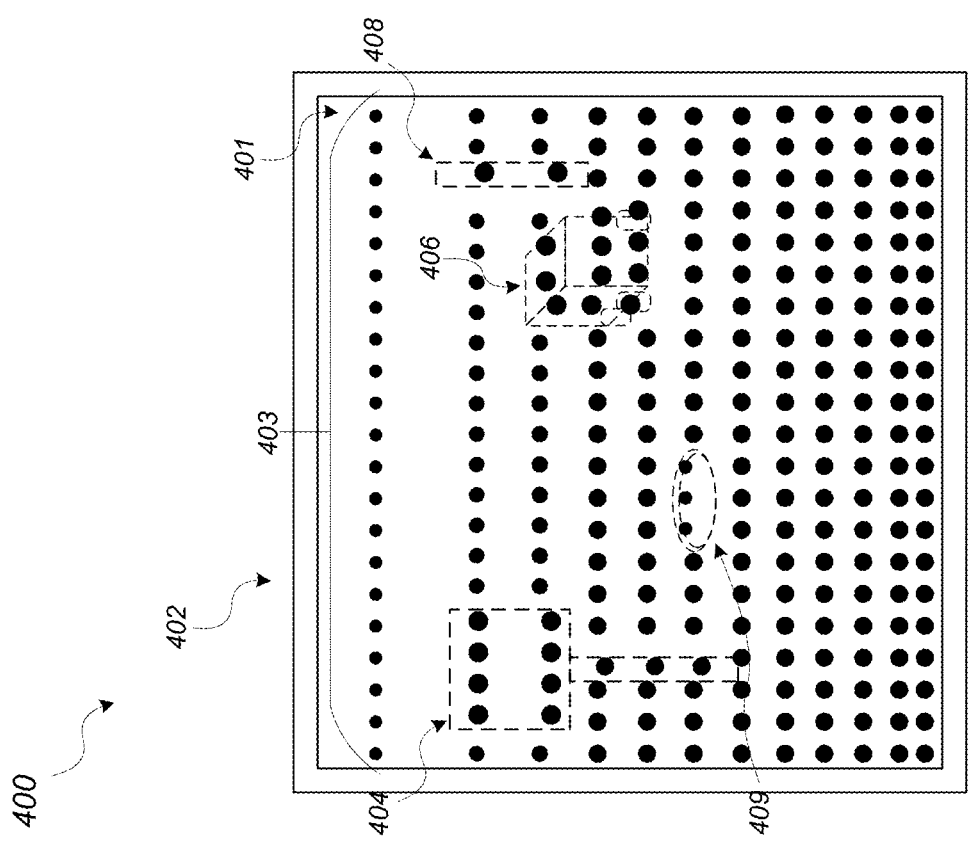

FIGS. 4A-B illustrate sensor data 400 of an environment 401 captured by a vehicle, such as the vehicle 100 of FIG. 1. The sensor data 400 may include a lidar frame 402 as illustrated in FIG. 4A and an image frame 410 as illustrated in FIG. 4B.

FIG. 4A illustrates a lidar frame 402 of the environment 401. The lidar frame 402 may correspond to the one or more lidar frames 110 of FIG. 1. The lidar frame 402 may indicate a plurality of lidar data points 403. The lidar frame 402 may be generated based on a light signal being sent from the vehicle and reflected as a reflected light signal by one or more objects in the environment 401. For example, a road sign 404 may include a plurality of retroreflectors configured to reflect the light signal from the vehicle as a reflected light signal. The plurality of lidar data points 403 may indicate depth data that represents a relative distance to one or more objects that reflect the light signal. The vehicle may include a detection system configured to determine that an arrangement of a portion of the lidar data points 403 represent the road sign 404. The detection system may determine other objects based on an intensity of the lidar data points 403 in the reflected light signal. Another vehicle 406 may have a plurality of retroreflectors in particular configurations or arrangement patterns that identify the other vehicle 406. For example, an arrangement pattern of the plurality of retroreflectors of the other vehicle 406 may indicate that the vehicle is facing a rear portion of the other vehicle 406.

The vehicle may also identify other objects that do not include reflectors based on a relative depth of the associated lidar data points 403. For example, the vehicle may identify a post 408 by determining that a portion of the lidar data points 403 has a shorter distance from the vehicle than neighboring lidar data points 403. The vehicle may also identify a pothole 409 by determining that a portion of the lidar data points 403 have a farther distance from the vehicle than neighboring lidar data points 403.

FIG. 4B illustrates an image frame 410 of the environment 401. The image frame 410 may correspond to the one or more sensor frames 114 of FIG. 1. The image frame 410 may be captured by one or more cameras, such as the one or more sensors 112 of FIG. 1. In some embodiments, the imaging sensor may include an optical sensor, such as a camera. In other embodiments, the imaging sensor may include a radar sensor. In some embodiments, the image frame 410 may include a radar data frame captured by the radar sensor. The image frame 410 may include RGB data indicating an optical view of the environment 401. The image frame 410 may indicate objects in the environment 401 including a road sign 414, another vehicle 416, a post 418 or a pothole 419.

The image frame 410 may also include depth data based on data from the radar sensor or a depth-sensing camera. The depth data may indicate a relative distance to each of the objects in the environment 401. The depth data in the image frame 410 may be correlated with corresponding depth data in the lidar frame 402 to verify the relative distances. For example, an autonomous vehicle may verify the relative distances to ensure a safe distance is between the vehicle and the objects, such as the other vehicle 416.

At longer distances away from the vehicle, the lidar data points 403 may become more sparse or have a larger relative distance between adjacent lidar data points 403. In some embodiments, the detection system may generate additional lidar data points based on applying the predictive model to the image frame 410. In other embodiments, the sparseness of the lidar data points 403 may indicate the relative distance to an object that corresponds to a portion of the lidar data points 403.

Figure 5:
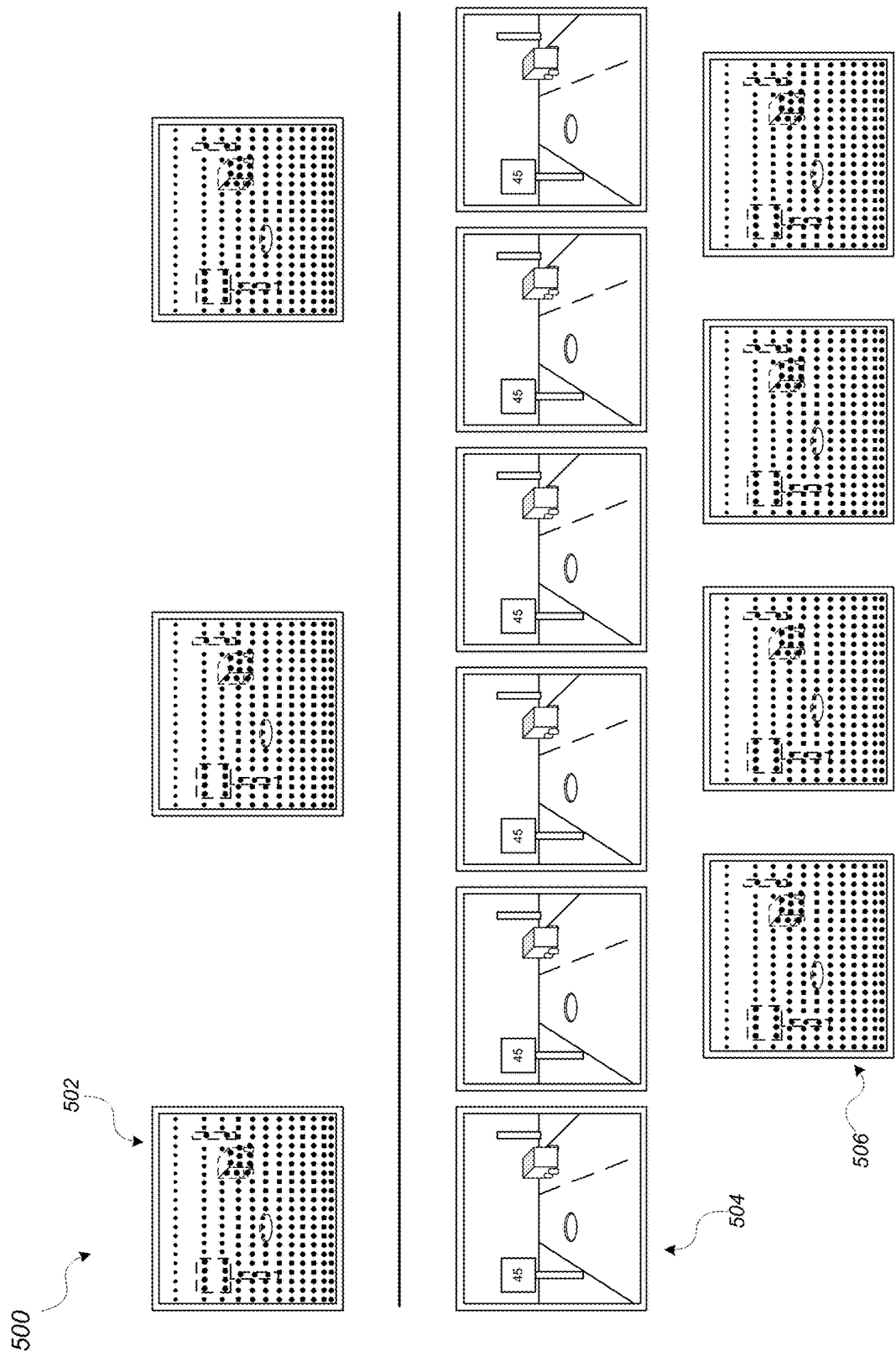
FIG. 5 illustrates a timeline diagram for generating predicted lidar frames based on captured lidar frames and captured sensor frames from one or more sensors.

FIG. 5 illustrates a timeline diagram 500 of a detection system of a vehicle generating predicted lidar frames 506 based on a plurality of lidar frames 502 and a plurality of sensor frames 504. The plurality of lidar frames 502 may be captured by a lidar sensor of a vehicle. The plurality of sensor frames 504 may be captured by one or more sensors of the vehicle.

The one or more sensors may have a capture rate that is faster than a capture rate of the lidar sensor. For example, the lidar sensor may take more time to capture a new lidar frame 502 than the one or more sensors can capture a new sensor frame 504. Because of the delay in time between each lidar frame 502, the detection system may be configured to generate predicted lidar frames 506 to provide additional lidar frames between capture of the lidar frames 502. The detection system may include a predictive model that may be configured to generate the predicted lidar frames 506 based on the lidar frames 502 and the sensor frames 504.

The detection system may generate the predicted lidar frames 506 at a rate that is faster than the capture rate of the lidar sensor. The predicted lidar frames 506 may be provided by the detection system to a display device or other system that requires lidar frames. For example, the display device may generate a heads-up display based on the predicted lidar frames 506.

FIGS. 6A-C illustrate generation of a heads-up display 620 for an environment 602 based on an image frame 600 and a predicted lidar frame 610. The heads-up display 620 may be displayed via a display device of a vehicle. The display device may correspond to the display device 116 of FIG. 1. The vehicle may correspond to the vehicle 100 of FIG. 1.

FIG. 6A illustrates an image frame 600 of the environment 602 captured by an imaging sensor. The imaging sensor may correspond to the one or more sensors 112 of FIG. 1. The image frame may correspond to the one or more sensor frames 114 of FIG. 1. The image frame 600 may indicate that a road sign 604 is at least partially obstructed by another vehicle 606. In some embodiments, the image frame 600 may represent a radar data frame captured by a radar sensor.

FIG. 6B illustrates a predicted lidar frame 610 of the environment 602 generated by a detection system. The detection system may correspond to the detection system 102 of FIG. 1. The predicted lidar frame 610 may correspond to the predicted lidar frame 106 of FIG. 1. The predicted lidar frame 610 may include a plurality of lidar data points 612 that may be generated based on historical data, the image frame 600 or both. In some embodiments, the predicted lidar frame 610 may be generated by the detection system based on an expected road condition. For example, the expected road condition may exclude the other vehicle 606 from generation of the predicted lidar frame 610 to indicate an expected presence of the road sign 614.

The predicted lidar frame 610 may be generated based on a machine learning algorithm (e.g., a neural network). The neural network may be configured to determine an expected configuration of objects in the environment 602, such as the road sign 614 and excluding the vehicle 606. The neural network may learn over time that the road sign 614 is always at a particular location of the environment 602 while the vehicle 606 is not always at the particular location.

FIG. 6C illustrates a heads-up display 620 of the environment 602 that may be generated by a display device based on the image frame 600 and the predicted lidar frame 610. In some embodiments, the heads-up display 620 may generate an overlay over the image frame 600. In other embodiments, the heads-up display 620 may generate an overlay over a windshield (e.g., real visual space) such that the overlay is shown over what a passenger visually sees through the windshield.

The heads-up display 620 may indicate that a road sign 624 is partially obstructed by another vehicle 626. An obstructed portion 628 of the road sign 624 may be marked in the heads-up display 620. In some embodiments, the obstructed portion 628 may be marked by a silhouette including a dotted or dashed outline. In other embodiments, the obstructed portion 628 may include shading or coloring that indicates obstruction by the other vehicle 626. In yet other embodiments, the obstruction portion 628 may be indicated by a geometric shape surrounding the obstructed portion 628 in the heads-up display 620, such as a rectangular box or a circle.

Figure 7:
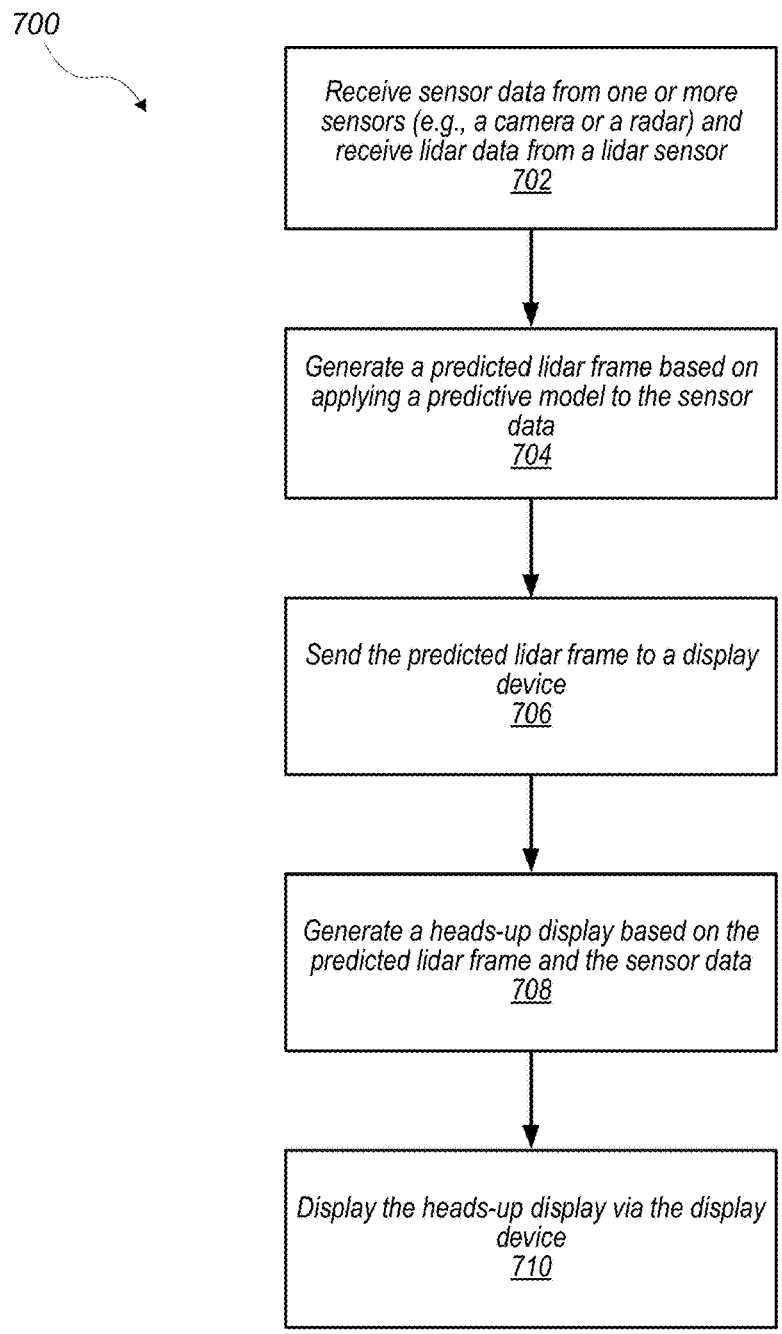
FIG. 7 illustrates a method for generating predicted lidar frames for a heads-up display system.

FIG. 7 illustrates a flowchart diagram of a method 700 for generating predicted lidar frames for a heads-up display system.

At 702, a vehicle may receive sensor data from one or more sensors and lidar data from a lidar sensor. The vehicle may correspond to the vehicle 100 of FIG. 1. The sensor data may correspond to the one or more sensor frames 114 of FIG. 1 or the image frame 410 of FIG. 4B. The one or more sensors may correspond to the one or more sensors 112 of FIG. 1. The lidar data may correspond to the one or more lidar frames 110 of FIG. 1 or the lidar frame 402 of FIG. 4A. The lidar sensor may correspond to the lidar sensor 108 of FIG. 1.

At 704, the vehicle may include a lidar prediction system configured to generate a predicted lidar frame based on applying a predictive model to the sensor data. The lidar prediction system may correspond to the detection system 102 of FIG. 1. In some embodiments, the predictive model includes one or more transformation functions that accept one or more image frames, one or more radar data frames or one or more sensor data frames as an input. The one or more transformation functions may transform sensor data in the one or more sensor frames to one or more lidar data points. The lidar data points may then be stored as a predicted lidar frame. In some embodiments, the predictive model may use one or more previous lidar frames captured by the lidar sensor to seed generation of the predicted lidar frame by providing a reference point of known good lidar data points in the previous lidar frames.

At 706, the lidar prediction system may be configured to send the predicted lidar frame to a display device. The display device may correspond to the display device 116 of FIG. 1. In some embodiments, the display device may be included in the vehicle. In other embodiments, the display device may be a mobile device, such as a cellular phone or tablet, communicatively coupled to the vehicle. In yet other embodiments, the display device may be included in a remote monitoring system configured to provide visual information of the vehicle to an outside party.

At 708, the vehicle may be configured to generate a heads-up display based on the predicted lidar frame and the sensor data. The heads-up display may correspond to heads-up display 620 of FIG. 6C. In some embodiments, the display device may include one or more hardware components and one or more software components configured to generate the heads-up display. The heads-up display may include information about objects detected by the sensors of the vehicle. In some embodiments, the heads-up display may be an overlay on top of a live video feed of the nearby environment. In other embodiments, the heads-up display may be an overlay on top of a rendering of the nearby environment that may be generated based on the predicted lidar data, as described herein.

At 710, the vehicle may display the heads-up display via the display device. The vehicle may include additional hardware elements configured to project the heads-up display to a surface in the vehicle, such as a windshield, to provide an overlay displaying the heads-up display to a passenger of the vehicle. In other embodiments, the display device may be integrated into a console of the vehicle.

Figure 8:
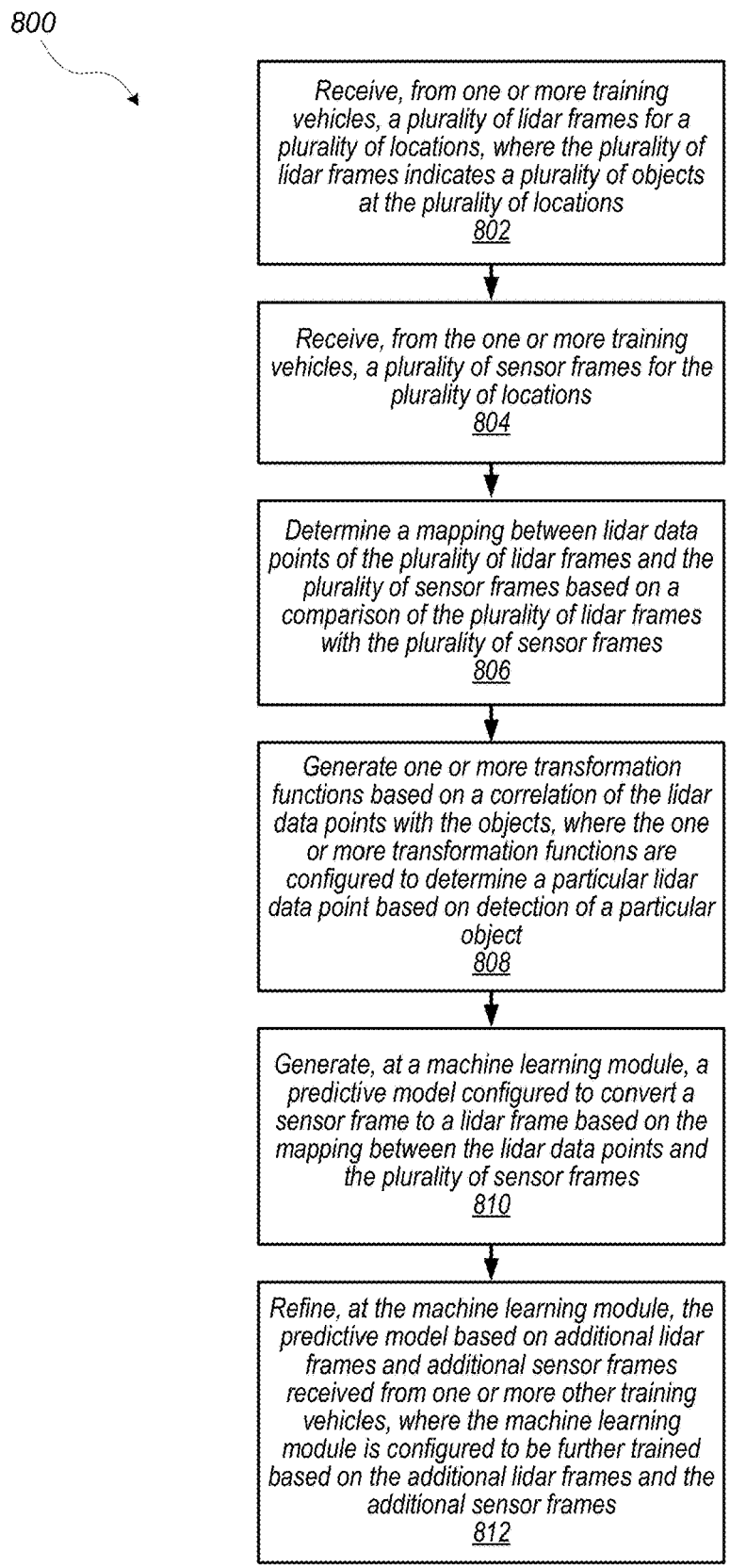
FIG. 8 illustrates a method for generating a predictive model based on sensor data from one or more training vehicles.

FIG. 8 illustrates a flowchart diagram of a method 800 for generating a predictive model based on machine learning algorithms, according to some embodiments.

At 802, a model generation system receives, from one or more training vehicles, a plurality of lidar frames for a plurality of locations, where the plurality of lidar frames indicates a plurality of objects at the plurality of locations. The model generation system may correspond to the model generation system 302 of FIG. 3. The one or more training vehicles may correspond to the training system 310 of FIG.

3. The plurality of lidar frames may correspond to the lidar frames 314 of FIG. 3. The training vehicles may capture lidar frames using one or more lidar sensors. The training vehicles may be a part of a fleet of training vehicles configured to capture large amounts of data of multiple locations. The training vehicles may send the lidar frames to the model generation system after traversing the multiple locations, such as a mapping expedition. In some embodiments, the training vehicles may include a network device configured to send the lidar frames to the model generation system via a network.

At 804, the model generation system receives, from the one or more training vehicles, a plurality of sensor frames for the plurality of locations. The plurality of sensor frames may correspond to the one or more sensor frames 316 of FIG. 3. The training vehicles may capture sensor frames using one or more other sensors, such as cameras or radar sensors. The training vehicles may send the sensor frames to the model generation system after traversing the multiple locations, such as a mapping expedition. In some embodiments, the training vehicles may include a network device configured to send the sensor frames to the model generation system via a network.

At 806, the model generation system determines a mapping between lidar data points of the plurality of lidar frames and the plurality of sensor frames based on a comparison of the plurality of lidar frames with the plurality of sensor frames. The model generation system may utilize a machine-learning module to determine how the lidar data points correlate with various objects contained in the plurality of sensor frames. For example, the machine-learning module may identify a pattern of lidar data points that occur when a particular object or series of objects is detected in the plurality of sensor frames. Each of the plurality of lidar fames may have at least one corresponding sensor frame of the plurality of sensor frames. The training vehicles may position the lidar sensors next to the one or more other sensors such that the lidar sensors and the one or more other sensors have substantially similar fields of view.

At 808, the model generation system generates one or more transformation functions based on a correlation of the lidar data points with the objects, where the one or more transformation functions are configured to determine a particular lidar data point based on detection of a particular object. The transformation functions may correspond to the transformation functions 306 of FIG. 3. The transformation functions may further determine the particular lidar data point based on a perceived depth extrapolated from a stereoscopic camera system.

At 810, the model generation system generates, at a machine learning module of the model generation system, a predictive model configured to convert one or more sensor frames (e.g., one or more image frames or one or more radar data frames) to a lidar frame based on the mapping between the lidar data points and the plurality of sensor frames. The predictive model may correspond to the predictive model 304 of FIG. 3. The predictive model may also be configured to convert a plurality of sensor frames to a lidar frame based on the mapping between the lidar data points and the plurality of sensor frames. The predictive model may include the one or more transformation functions such that different objects may trigger different transformation functions when predicting the lidar data points. The predictive model may be configured to accept one or more inputs including one or more sensor frames from one or more sensors (e.g., an optical sensor or a radar sensor). In other embodiments, the one or more inputs also includes one or more previous lidar data frames as a seed to provide a reference point for an expected set of lidar data points.

At 812, the model generation system refines, at the machine learning module, the predictive model based on additional lidar frames and additional sensor frames received from one or more other training vehicles, where the machine learning module is configured to be further trained based on the additional lidar frames and the additional sensor frames. After generation of the predictive model, additional training vehicles may be configured to further refine the predictive model based on capturing additional lidar frames and additional sensor frames. The machine learning module may also improve its learning technique by being exposed to more raw data and corresponding expected data points.

Figure 9:
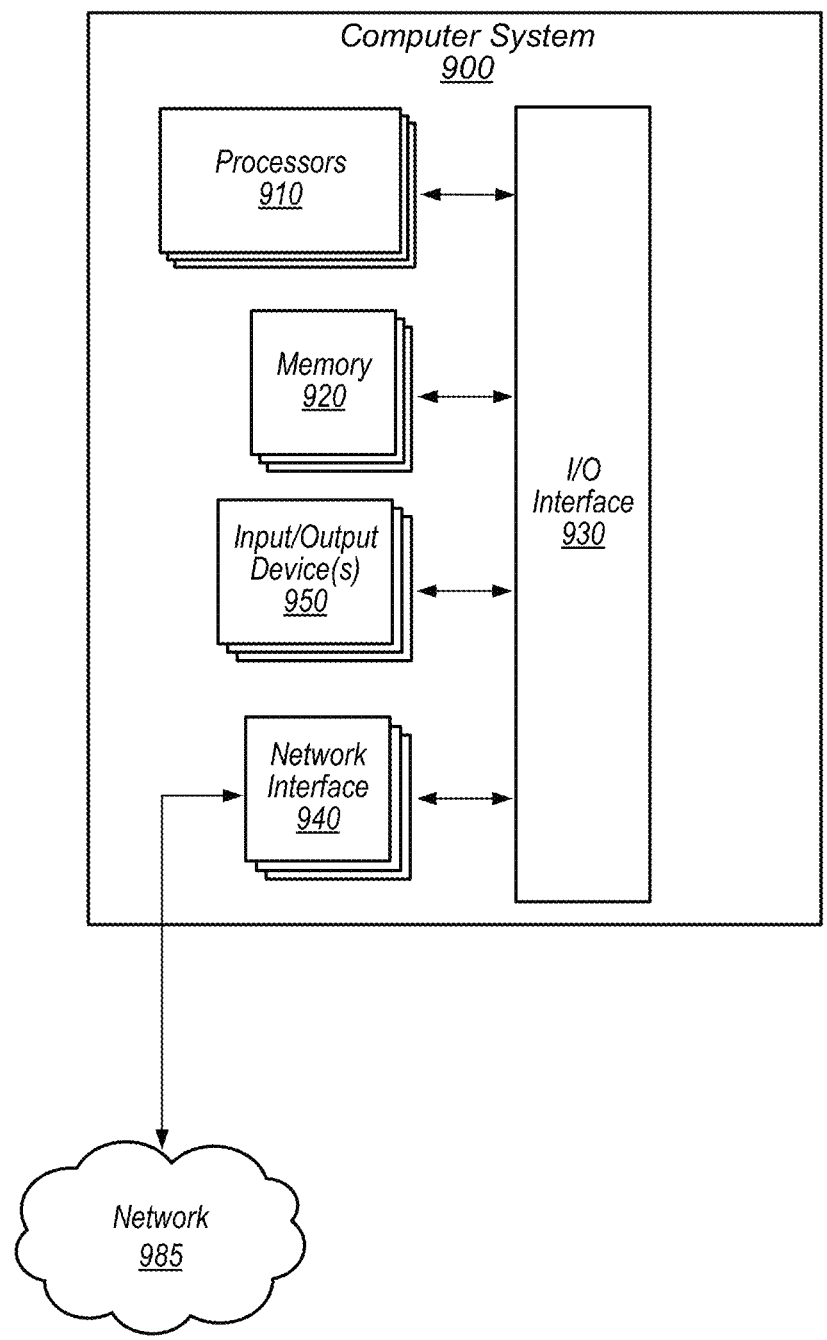
FIG. 9 illustrates an example computer system configured to implement one or more portions of a motion minimization system, according to some embodiments.

FIG. 9 illustrates an example computer system 900 that may be configured to include or execute any or all of the embodiments described above. In different embodiments, computer system 900 may be any of various types of devices, including, but not limited to, a personal computer system, desktop computer, laptop, notebook, tablet, slate, pad, or netbook computer, cell phone, smartphone, PDA, portable media device, mainframe computer system, handheld computer, workstation, network computer, a camera or video camera, a set top box, a mobile device, a consumer device, video game console, handheld video game device, application server, storage device, a television, a video recording device, a peripheral device such as a switch, modem, router, or in general any type of computing or electronic device.

Various embodiments of an audio communication system, talker feedback system, some combination thereof, etc., as described herein, may be executed in one or more computer systems 900, which may interact with various other devices. Note that any component, action, or functionality described above with respect to FIGS. 1 through 8 may be implemented on one or more computers configured as computer system 900 of FIG. 9, according to various embodiments. In the illustrated embodiment, computer system 900 includes one or more processors 910 coupled to a system memory 920 via an input/output (I/O) interface 930. Computer system 900 further includes a network interface 940 coupled to I/O interface 930, and one or more input/output devices, which can include one or more user interface (also referred to as "input interface") devices. In some cases, it is contemplated that embodiments may be implemented using a single instance of computer system 900, while in other embodiments multiple such systems, or multiple nodes making up computer system 900, may be configured to host different portions or instances of embodiments. For example, in one embodiment some elements may be implemented via one or more nodes of computer system 900 that are distinct from those nodes implementing other elements.

In various embodiments, computer system 900 may be a uniprocessor system including one processor 910, or a multiprocessor system including several processors 910 (e.g., two, four, eight, or another suitable number). Processors 910 may be any suitable processor capable of executing instructions. For example, in various embodiments processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

System memory 920 may be configured to store program instructions, data, etc. accessible by processor 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions included in memory 920 may be configured to implement some or all of an ANS, incorporating any of the functionality described above. Additionally, existing control data of memory 920 may include any of the information or data structures described above. In some embodiments, program instructions and/or data may be received, sent or stored upon different types of computer-accessible media or on similar media separate from system memory 920 or computer system 900. While computer system 900 is described as implementing the functionality of functional blocks of previous FIGs., any of the functionality described herein may be implemented via such a computer system.

In one embodiment, I/O interface 930 may be configured to coordinate I/O traffic between processor 910, system memory 920, and any peripheral devices in the device, including network interface 940 or other peripheral interfaces, such as input/output devices 950. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices attached to a network 985 (e.g., carrier or agent devices) or between nodes of computer system 900. Network 985 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 940 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices may, in some embodiments, include one or more display terminals, keyboards, keypads, touchpads, scanning devices, voice or optical recognition devices, or any other devices suitable for entering or accessing data by one or more computer systems 900. Multiple input/output devices may be present in computer system 900 or may be distributed on various nodes of computer system 900. In some embodiments, similar input/output devices may be separate from computer system 900 and may interact with one or more nodes of computer system 900 through a wired or wireless connection, such as over network interface 940.

Memory 920 may include program instructions, which may be processor-executable to implement any element or action described above. In one embodiment, the program instructions may implement the methods described above. In other embodiments, different elements and data may be included. Note that data may include any data or information described above.

Those skilled in the art will appreciate that computer system 900 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 900 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 900 may be transmitted to computer system 900 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A vehicle, comprising:
one or more sensors comprising at least an optical sensor or a radar sensor configured to capture sensor data of a particular view at a sensor capture rate;
a light detection and ranging (lidar) sensor configured to capture lidar data points of the particular view at a lidar capture rate, wherein the lidar capture rate is slower than the sensor capture rate;
a lidar prediction system comprising a predictive model, the lidar prediction system configured to:
generate one or more predicted lidar data points based at least on application of the predictive model to the sensor data captured by the one or more sensors;
generate a predicted lidar frame based at least on the one or more predicted lidar data points; and
send the predicted lidar frame to a component of the vehicle configured to receive the captured lidar data points and the predicted lidar frame.

2. The vehicle of claim 1, further comprising a display device comprising a heads up display system, wherein the external system comprises the display device, and wherein the heads up display system is configured to:
generate a heads up display based on the predicted lidar frame and the sensor data; and
display the heads up display via the display device.

3. The vehicle of claim 1, further comprising an autonomous control system, wherein the external system comprises the autonomous control system, and wherein the autonomous control system is configured to:
analyze the predicted lidar frame to identify one or more objects in the particular view;
determine an autonomous control based on an identification of the one or more objects; and
send a control instruction to one or more control elements to implement the autonomous control.

4. The vehicle of claim 1, wherein the predicted lidar frame comprises a representation of an object that is obstructed by an obstruction of the lidar sensor in the particular view.

5. The vehicle of claim 1, wherein the lidar prediction system is further configured to refine the predictive model based on one or more of sensor data captured by the one or more sensors, lidar data points captured by the lidar sensor, or additional predicted lidar frames predicted by the lidar prediction system.

6. The vehicle of claim 1, wherein to generate the one or more predicted lidar data points, the lidar prediction system is further configured to apply the predictive model to one or more sensor frames included in the sensor data further based on a lidar data point captured using the lidar sensor.

7. The vehicle of claim 1, wherein to generate the one or more predicted lidar data points, the lidar prediction system is further configured to modify the sensor data based on map data of a surrounding environment and based on a relative distance between the lidar sensor and the one or more sensors.

8. The vehicle of claim 1, wherein the optical sensor has a latency that is lower than a latency of the lidar sensor.

9. The vehicle of claim 1, wherein the one or more sensors further comprise one or more motion sensors, a location sensor, or both.

10. A method, comprising:
capturing, with one or more sensors of a vehicle, sensor data of a particular view at a sensor capture rate;
capturing, with a light detection and ranging (lidar) sensor of the vehicle, lidar data points of the particular view at a lidar capture rate, wherein the lidar capture rate is slower than the sensor capture rate;
generating, at a lidar prediction system for the vehicle, one or more predicted lidar data points based at least on application of a predictive model to the sensor data captured by the one or more sensors;
generating a predicted lidar frame based at least on the one or more predicted lidar data points; and
sending the predicted lidar frame to another system configured to receive the captured lidar data points and the predicted lidar frame.

11. The method of claim 10, further comprising:
generating, at a heads up display system of the other system, a heads up display based on the predicted lidar frame and the sensor data; and
displaying the heads up display via a display device of the other system.

12. The method of claim 10, further comprising:
analyzing, at an autonomous control system of the other system, the predicted lidar frame to identify one or more objects in the particular view;
determining, at the autonomous control system, an autonomous control based on an identification of the one or more objects; and
sending, from the autonomous control system, a control instruction to one or more control elements to implement the autonomous control.

13. The method of claim 10, wherein the predicted lidar frame comprises a representation of an object that is obstructed by an obstruction of the lidar sensor in the particular view.

14. The method of claim 10, further comprising:
refining the predictive model based on one or more of sensor data captured by the one or more sensors, lidar data points captured by the lidar sensor, or predicted lidar frames predicted by the lidar prediction system.

15. The method of claim 10, wherein generating the one or more predicted lidar data points comprises:
applying the predictive model to one or more sensor frames included in the sensor data further based on a lidar data point captured using the lidar sensor.

16. The method of claim 10, wherein generating the one or more predicted lidar data points comprises:
modifying the sensor data based on map data of a surrounding environment and based on a relative distance between the lidar sensor and the one or more sensors.

17. The method of claim 10, further comprising instructions that, when executed on or across the one or more processors, cause the one or more processors to:
refine the predictive model based on one or more of sensor data captured by the one or more sensors, lidar data points captured by a lidar sensor, or generated lidar frames.

18. The method of claim 10, further comprising instructions that, when executed on or across the one or more processors, cause the one or more processors to:
apply the predictive model to one or more sensor frames included in the sensor data further based on a lidar data point captured using a lidar sensor.

19. One or more non-transitory, computer-readable storage media storing instructions that, when executed on or across one or more processors, cause the one or more processors to:
- access sensor data of a particular view captured by one or more sensors of a vehicle at a sensor capture rate, comprising at least an optical sensor or a radar sensor;
- generate one or more light detection and ranging (lidar) data points based at least on application of a predictive model to the sensor data;
- generate a lidar frame based at least on the one or more lidar data points; and
- send the generated lidar frame to another system configured to receive the generated lidar frame and a captured lidar frame that is captured by a lidar sensor of the vehicle.

20. The one or more non-transitory, computer-readable storage media of claim 19, wherein the generated lidar frame comprises a representation of an object that is obstructed by an obstruction of a lidar sensor in the particular view.

* * * * *